(12) United States Patent
Wooten

(10) Patent No.: US 11,454,776 B1
(45) Date of Patent: Sep. 27, 2022

(54) FIBER OPTIC PROTECTION ASSEMBLY FOR PREVENTING FLUID FROM ENTERING INTO A FIBER TERMINATION SUB

(71) Applicant: SOUTHERN GRACE PROPERTIES, LLC, Laurel, MS (US)

(72) Inventor: E. J. Wooten, Laurel, MS (US)

(73) Assignee: SOUTHERN GRACE PROPERTIES, LLC, Laurel, MS (US)

( * ) Notice: Subject to any disclaimer, the term of this patent is extended or adjusted under 35 U.S.C. 154(b) by 0 days.

(21) Appl. No.: 17/689,737

(22) Filed: Mar. 8, 2022

Related U.S. Application Data

(60) Provisional application No. 63/187,105, filed on May 11, 2021.

(51) Int. Cl.
   *G02B 6/44* (2006.01)
(52) U.S. Cl.
   CPC ......... *G02B 6/4494* (2013.01); *G02B 6/4488* (2013.01)
(58) Field of Classification Search
   CPC .............................. G02B 6/4494; G02B 6/4488
   See application file for complete search history.

(56) References Cited

U.S. PATENT DOCUMENTS

2020/0012050 A1* 1/2020 Takano ................ G02B 6/3887

* cited by examiner

*Primary Examiner* — Sung H Pak
*Assistant Examiner* — Hoang Q Tran
(74) *Attorney, Agent, or Firm* — Hulsey P.C.

(57) ABSTRACT

Fiber optic protection assembly for preventing fluid from entering into a fiber termination sub, including a sub having disc-receiving areas and inner channel connecting the disc-receiving areas. Disc-receiving areas receive plurality of discs, each disc having a disc channel. The sub includes tension bolts, each having a bolt channel. The sub receives a fiber tube or a Fiber in Metal Tube (FIMT) comprising fiber optic cables through bolt channels, disc channels of the discs and inner channel. Discs properly seal the void in the sub to ensure protection to the insulation, center conductor and fiber tube/FIMT. When the fiber optic protection assembly is lowered into the well, hydrostatic pressure compresses the discs and O-rings of the top tension bolt ensure protection to the insulation that houses the fiber tube. Compression of the discs ensures no pressure gets to the bottom tension bolt, thus protecting fiber optic strands from hydrostatic pressure.

20 Claims, 3 Drawing Sheets

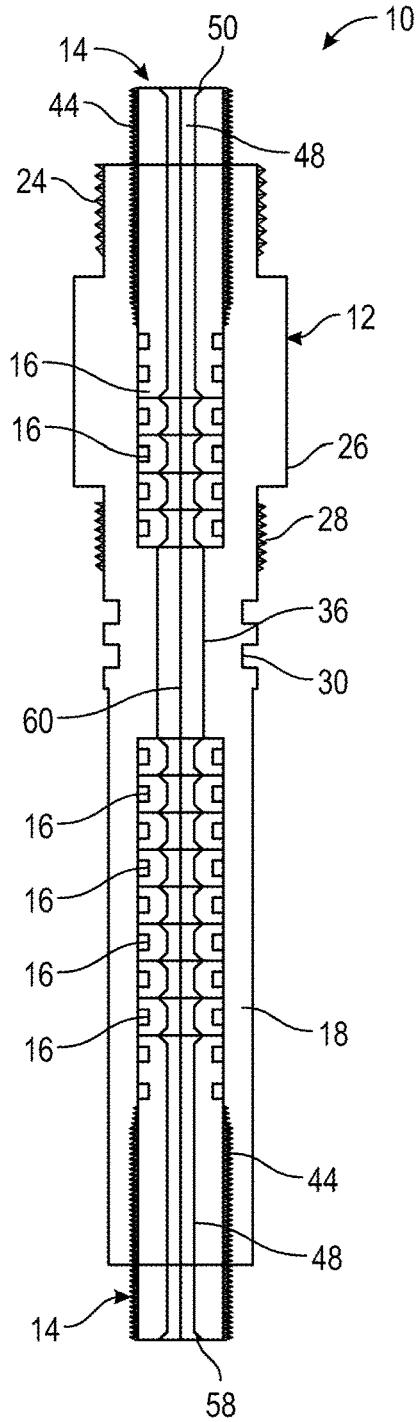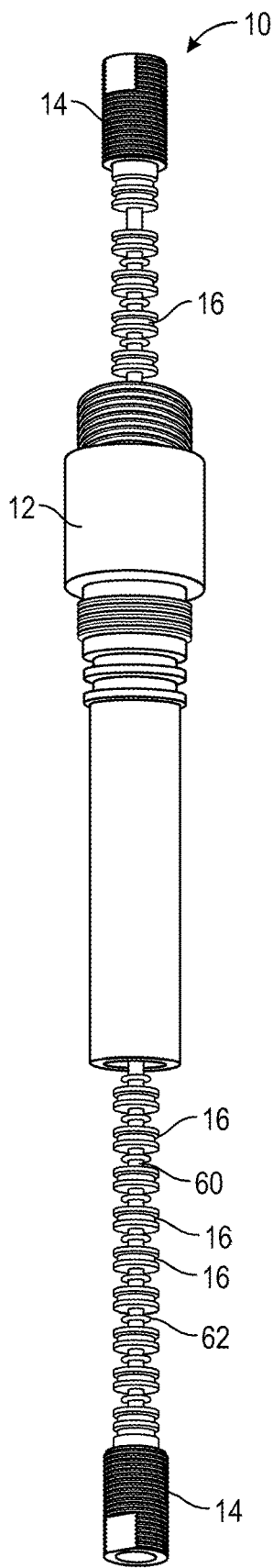
FIG. 5
FIG. 6

FIBER OPTIC PROTECTION ASSEMBLY FOR PREVENTING FLUID FROM ENTERING INTO A FIBER TERMINATION SUB

The present application claims the benefit of U.S. Provisional Application No. 63/187,105, filed May 11, 2021; all of which is incorporated herein by reference.

FIELD OF INVENTION

The present invention generally relates to a fiber optic protection apparatus. More specifically, the present invention relates to a fiber optic protection assembly that stops the flow of wellbore fluids under hydrostatic pressure from entering the fiber termination sub.

BACKGROUND OF INVENTION

Wireline is an important product in the energy industry. Wireline is preferred for its strength when used as a lifting mechanism. Specially designed wireline cables with a counter helix design provide the strength needed for smaller diameter electro-mechanical wirelines. Further, electro-mechanical wirelines utilize stranded armors of carbon steel or corrosion resistant material and contain one or more individual copper conductors that are insulated with various rubber/polymer compounds. The insulator material determines the maximum temperature that a cable can be exposed to. Wireline allows for rapid deployment of instruments, gauges, explosives and other specialized tools. Devices and tools attached to electro-mechanical wirelines provide a wide assortment of services necessary for the identification, isolation and production of hydrocarbons.

Wireline products and applications have undergone continuous design changes and improvements to accommodate the technological advancement of deployment methods, downhole electronic tools and explosives used in the energy industry today. For example, digital technology provided a method for large quantities of data to be moved at faster speeds over greater distances in less time. Improvements to data capture and data transmission allowed energy industry companies to test the use of fiber optics in oil and gas environments. In the oil and gas industry, fiber optics have been proved to be an excellent product as a transporter/carrier of data and eventually as a gatherer of micro-seismic data in downhole applications. The success of fiber optics for surface communications and data transport began the search for ways to deploy and utilize the benefits of fiber optics in the drilling, completion and production of hydrocarbon wells across the globe.

Fiber optic cables have been used in the completion and production of hydrocarbons from the 1990's. It is known that optic fibers are placed in a protective tube that would provide strength to the overall length desired and provide protection for the fiber strands from damage and protection from hydrogen that was a part of the wellbore fluids. The method of deploying optic fibers for permanent placement downhole is still being used today.

With improvements in manufacturing processes, the rugosity and strength of individual fibres has increased thereby allowing the users of fiber optic technology to search for methods to deploy a fiber optic cable into a wellbore for a defined amount of test, retrieve the fiber optic cable and redeploy the fiber optic as needed into different wellbores.

Typical fiber optic cable package includes fiber cables provided in a Fiber In Metal Tube (FIMT) with copper along the outside of the FIMT. The FIMT and copper are then wrapped with a rubber/polymer compound that insulates the stranded copper from the inner armor and from the wellbore fluids. The strength of the cable is provided by the multiple outer and inner armors that are wrapped in a counter helix fashion.

However, the FIMT introduces a new problem to the deployment of the fiber optic cable. The wireline industry uses a widely accepted process to put the head of the fiber optic cable (or cable head) on the end of the cable. This cable head is built with adequate strength to hoist tools, devices and explosives. The cable head also allows for the termination and isolation of the copper conductor. The isolation of the copper wire from fluid is achieved by injecting di-electric grease into a void inside the cable head where the copper is terminated. Termination of the copper is made to a double O-ring tear drop sub that would allow electrical tools to be screwed onto the bottom hole assembly. When the void area is filled with di-electric grease, the electrical connection is then insulated from the wellbore fluids. If wellbore fluids contact the electrical connection, an electrical short of the circuitry occurs.

The introduction of the FIMT into the stranded cable and its cable head introduces another problem. Wellbore fluids must not be allowed to enter the area where fibers are terminated inside the fiber termination sub. The individual glass fibers cannot be subjected to immersion or contact with the wellbore fluids. Hydrogen, an element of both water, oil and gas will damage the ability of the fiber to reflect and refract light. If the fibers are exposed to hydrogen the entire length of the hydrogen exposed fibers must be removed. The void/porosity that exists between the individual strands of outer and inner armor allow for the movement of wellbore fluids thru this void. Once the tensile strength of the cable is built within the cable head, the FIMT is cut to expose the individual fiber strands inside a termination sub. When the electrical insulation surrounding the copper and FIMT is removed the FIMT is now an open ended tube. Hydrostatic pressure is the force pressure of a column of fluid measured in pounds per square inch. Hydrostatic pressure increases as an object is lowered deeper into a column of fluid. The pound force measurement is dependent on the weight of the fluid in pounds per gallon and the height of the fluid column. The differential pound force pressure between the column of wellbore fluid and the lack of pound force pressure inside the FIMT causes the wellbore hydrostatic to equalize to the area of lower pressure in the FIMT. The equalization of pound force pressure of the fluid column into the FIMT exposes the individual fibers. This equalization is catastrophic to the integrity of the fibers and the equalization will continue until the pressure inside the FIMT is equal to the hydrostatic of the wellbore fluid. This equalization is known as "U tubing". In oil field drilling, U tubing is considered as a string of pipe (drill pipe and tubing) is in a wellbore and fluids are able to pass inside the string of pipe (drill pipe and tubing) and the annulus (area between wellbore and string of pipe). The U tubing identified the need for a process and product that would eliminate the equalization of the wellbore fluids and protect the fibers from the wellbore fluids.

Considering the above, there is a need for a fiber optic protection assembly that stops the flow of wellbore fluids under hydrostatic pressure from entering the fiber termination sub.

SUMMARY

It is an object of the present invention to provide a fiber optic protection assembly that protects fiber optic pack of sub and that avoids the drawback of known methods.

It is another object of the present invention to provide a fiber optic protection assembly that prevents fluid from being forced into the void of the sub where individual fibers are terminated.

It is another object of the present invention to provide a fiber optic protection assembly that ensures there is no hydrostatic pressure that gets to the termination sub that houses the fiber optic strands.

It is yet another object of the present invention to provide a fiber optic protection assembly that stops the flow of wellbore fluids under hydrostatic pressure from entering the fiber termination sub and allows for the protection of all fibers from the wellbore fluids during deployment of fiber optic intervention cable.

In order to achieve one or more objects, the present invention provides a fiber optic protection assembly. The fiber optic protection assembly includes a sub. The sub includes disc receiving areas at both ends and an inner channel connecting the disc receiving areas. The disc receiving areas configure to receive a plurality of discs, each disc having a disc channel. In one example, the sub receives four discs from one end, say at the top end and eight discs from the other end, say at the bottom end through the disc receiving areas. The sub further includes a pair of tension bolts or jam bolts. Each of the tension bolts includes a bolt channel. The bolt channel includes the same diameter as the disc channel.

The sub receives a fiber tube or protective tube or a Fiber in Metal Tube (FIMT) comprising fiber optic cables through the bolt channels, disc channels of the discs and the inner channel. When assembled, the fiber optic protection assembly withstands torque of up to 31 pounds on the bottom tension bolt.

In one aspect of the present invention, the fiber optic protection assembly includes a plurality of O-rings at the fiber tube. Each of plurality of O-rings positions between the tension bolts and adjoining discs, and adjacent discs of the plurality of discs. The plurality of O-rings helps to seal the gap created between the tension bolts and the adjacent discs, and between adjacent discs of the plurality of discs.

In one technical advantage of the present invention, the disc receiving areas are machined to ensure a proper seal for the discs to the sub. When 31 pounds of torque is administered or applied to the bottom tension bolt, the discs properly seal to ensure protection to the insulation, center conductor and fiber tube or FIMT. When the fiber optic protection assembly is lowered into the well facing the bottom tension bolt, the hydrostatic pressure compresses the discs at the top and the O-rings of the top tension bolt to the insulation that houses the fiber tube. The compression of the discs ensures no pressure gets to the bottom tension bolt, thus protecting the fiber optic strands from the hydrostatic pressure.

In one advantageous feature of the present invention, the presently disclosed fiber optic protection assembly provides proper sealing into the void or gap created in the sub with the help of discs. The sub having discs allows to prevent the fluid from being forced into the void of the sub where individual fibers are terminated.

In one advantageous feature of the present invention, the presently disclosed fiber optic protection assembly provides proper sealing with the help of multiple discs at both ends and stops the flow of wellbore fluids under hydrostatic pressure from entering the fiber termination sub. This ensures that the fiber optic cables or fiber optic strands housed in the fiber tube or FIMT are protected from the wellbore fluids during deployment of fiber optic intervention cable.

Features and advantages of the invention hereof will become more apparent in light of the following detailed description of selected embodiments, as illustrated in the accompanying Figures. As will be realised, the invention disclosed is capable of modifications in various respects, all without departing from the scope of the invention. Accordingly, the drawings and the description are to be regarded as illustrative in nature.

BRIEF DESCRIPTION OF THE DRAWINGS

Further features and advantages of the present invention will become apparent from the following detailed description, taken in combination with the appended drawings, in which:

FIG. 5 illustrates a cross-sectional view of a fiber optic protection assembly; and FIG. 6 illustrates an operational view of the fiber optic protection assembly encompassing a fiber tube or Fiber in Metal Tube (FIMT), in accordance with one exemplary embodiment of the invention.

It will be noted that throughout the appended drawings, like features are identified by like reference numerals.

DETAILED DESCRIPTION OF THE EMBODIMENTS

Before the present features and working principle of a fiber optic protection assembly is described, it is to be understood that this invention is not limited to the particular system as described, since it may vary within the specification indicated. Various features of a fiber optic protection assembly might be provided by introducing variations within the components/subcomponents disclosed herein. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It should be understood that the present invention describes a fiber optic protection assembly for preventing fluid from entering into a void of a sub. The fiber optic protection assembly includes a sub having disc receiving areas and an inner channel connecting the disc receiving areas. The disc receiving areas receive a plurality of discs, each disc having a disc channel. The sub includes tension bolts, each having a bolt channel. The sub receives a fiber tube or a Fiber in Metal Tube (FIMT) comprising fiber optic cables through the bolt channels, disc channels of the discs and the inner channel. The discs properly seal the void in the sub to ensure protection to the insulation, center conductor and fiber tube or FIMT. When the fiber optic protection assembly is lowered into the well, the hydrostatic pressure compresses the discs and the O-rings of the top tension bolt ensure protection to the insulation that houses the fiber tube. The compression of the discs ensures no pressure gets to the bottom tension bolt, thus protecting the fiber optic strands from hydrostatic pressure.

Various features and embodiments of a fiber optic protection assembly for preventing fluid from entering into a void of a sub are explained in conjunction with the description of FIGS. 1-6.

Figures 1A, 1B:
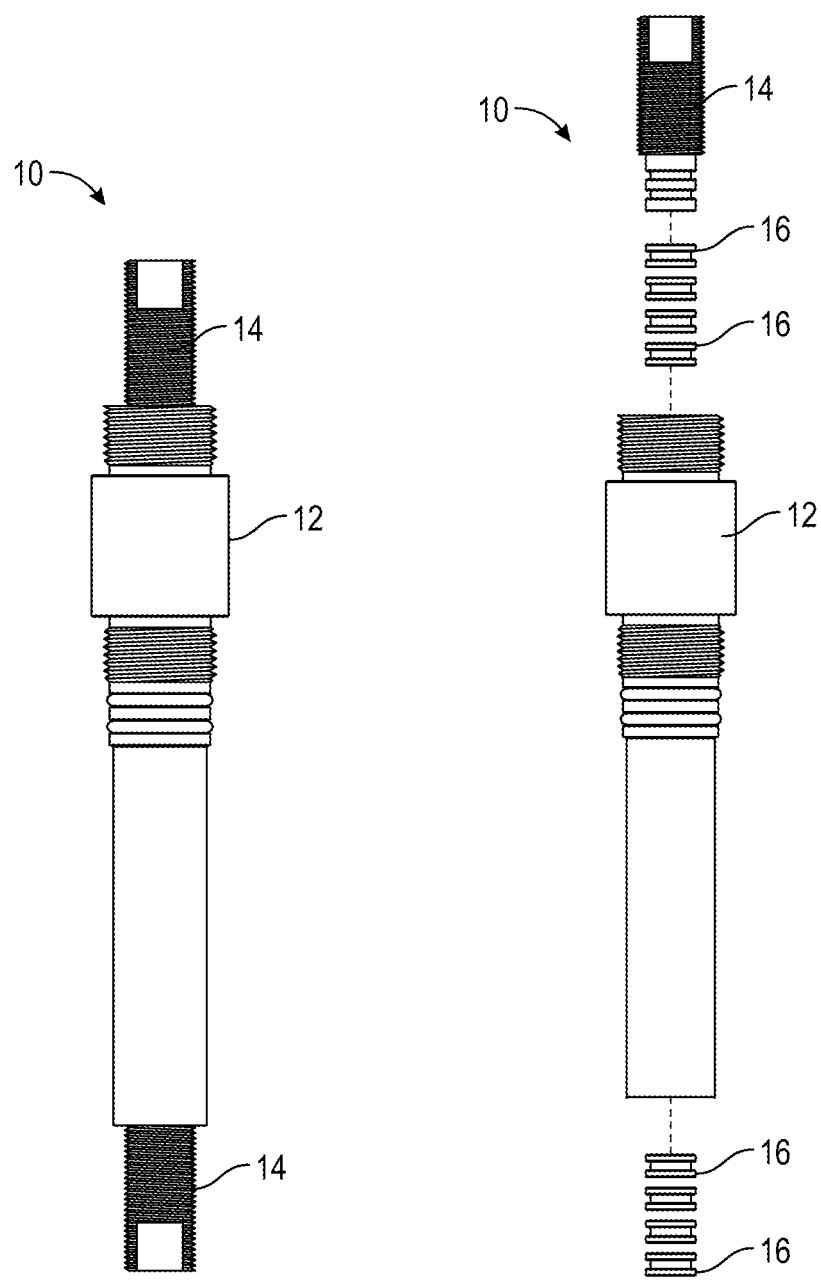
FIGS. 1A and 1B illustrate a front view and a front exploded view, respectively of a fiber optic protection assembly, in accordance with one embodiment of the present invention.

FIGS. 1A and 1B show a front view and a front exploded view, respectively of fiber optic protection assembly 10, in accordance with one embodiment of the present invention. Fiber optic protection assembly 10 includes sub 12. Sub 12 receives a pair of tension bolts or jam bolts 14 (or simply tension bolt 14 when referred to a single tension bolt) and a plurality of discs or washers 16 (or simply disc 16 when referred to a single disc).

Figure 2:
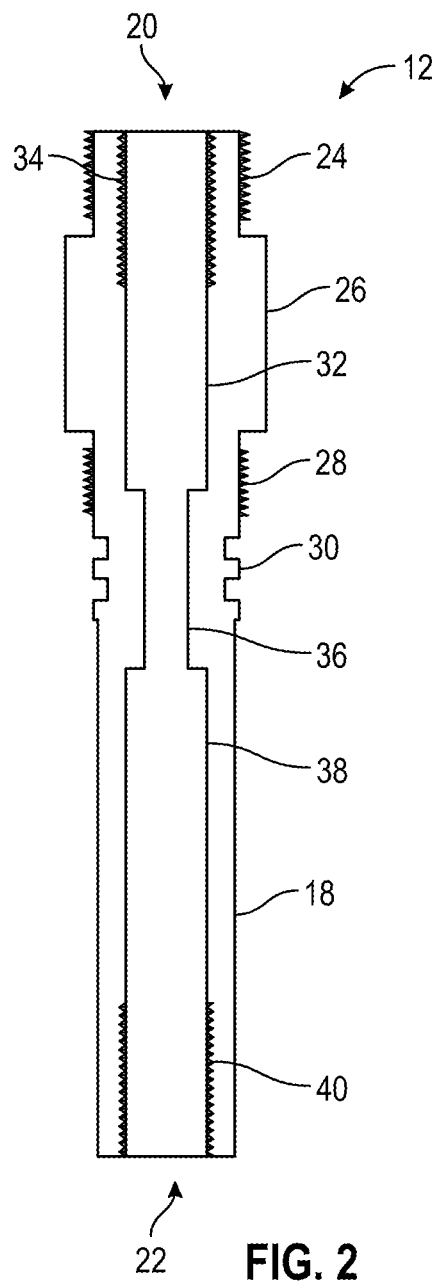
FIG. 2 illustrates a cross-sectional view of sub.

FIG. 2 shows a cross-sectional view of sub 12, in accordance with one embodiment of the present invention. Sub 12 includes elongated tube 18. Elongated tube 18 provides a material made of metal, hard plastic or any other suitable material. Elongated tube 18 has first end 20 and second end 22. At first end, elongated tube 18 encompasses first threaded portion 24 at the outer side. Threaded portion 24 allows connecting elongated tube 18 to adjacent elongated tube 18. Elongated tube 18 presents shell hood or collar 26. Further, elongated tube 18 includes threaded portion 28 adjacent to collar 26. Elongated tube 18 further presents first O-rings 30 adjacent to threaded portion 28.

At the inner side, elongated tube 18 encompasses first disc receiving area 32. At first end 20, first disc receiving area 32 encompasses threading portion 34. Threading portion 34 configures to receive tension bolt 14 from first end 20.

Further, first disc receiving area 32 connects inner channel 36, which in turn connects to second disc receiving area 38. Inner channel 36 positions parallelly to first O-rings 30. Second disc receiving area 38 has similar shape as first disc receiving area 32. Here, second disc receiving area 38 is longer than first disc receiving area 32 such that second disc receiving area 38 configures to receive more number of discs 16. Similar to first disc receiving area 32, second disc receiving area 38 includes threaded portion 40 at second end 22. Here, threaded portion 40 configures to receive tension bolt 14 from second end 22.

Figure 3A:
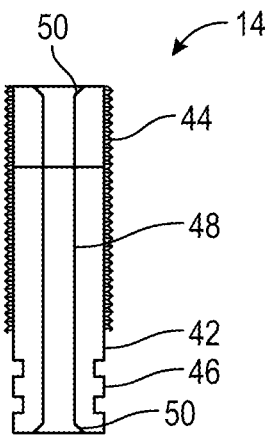
FIGS. 3A and 3B illustrate a top and a side cross-sectional view, respectively of a tension bolt.
Figure 3B:
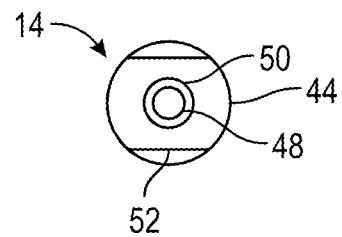

FIGS. 3A and 3B show a top and a side cross-sectional view, respectively of tension bolt 14, in accordance with one embodiment of the present invention. From FIGS. 1A and 1B, a person skilled in the art understands that the presently disclosed fiber optic protection assembly 10 includes two tension bolts 14, one connecting sub 12 at first end 20 and another connecting at second end 22. Each tension bolt 14 includes tube 42. Tube 42 provides a material made of metal or any other suitable material. Tube 42 presents threaded portion 44 at the end. As can be seen, threaded portion 44 positions at the outer side of tube 42 and allows connecting tube 44 to first disc receiving area 32 at threading portion 34. At the outer side, tube 42 includes second O-rings 46. At the inner side, tube 42 encompasses bolt channel or tube channel 48. Bolt channel 48 extends the entire length of tube 42. Bolt channel 48 presents tapered section 50 at both ends and allows receiving fiber tube 60 without getting damaged. Tube 42 further presents milled portion 52.

Figure 4A:
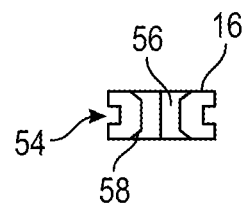
FIGS. 4A and 4B illustrate a top and a side cross-sectional view, respectively of a disc.
Figure 4B:
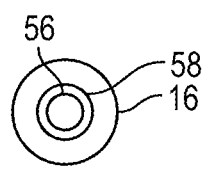

FIGS. 4A and 4B show a top and a side cross-sectional view, respectively of disc 16, in accordance with one embodiment of the present invention. Disc 16 encompasses groove (i.e., outer groove) 54 at its outer surface. Disc 16 further encompasses disc channels 56. Disc channels 56 indicate inner grooves configured for receiving fiber tube 60. Disc channels 56 include 45 degree tapered section 58 at both ends. Tapered section 58 allows receiving and extending fiber tube 60 through disc channels 56 without any damage.

As specified above, disc channels 56 receive fiber tube 60. Here, fiber tube 60 indicates a Fiber in Metal Tube (FIMT) made of metal such as stainless steel or any other suitable material. Fiber tube 60 provides a hermetically sealed, rugged and leak proof construction for very long sensor lengths. Fiber tube 60 is effective in protecting against hydrostatic pressures (ranging from 20,000 to 30,000 PSI), high temperature effects, and corrosive environments. Fiber tube 60 receives fiber optic strands or optical fiber sensors or optical sensor cables (not shown) that provide continuous and accurate monitoring of temperature, strain and acoustics over long distances or across large surfaces at the speed of light. Further, fiber tube 60 includes third O-rings 62. Third O-rings 62 connect in between discs 16 and help in sealing the gap or void created between adjacent discs 16, as shown in FIGS. 5 and 6.

Now referring to at least FIGS. 1B, 5 and 6, operation or construction of fiber optic protection assembly 10 is explained. At first, sub 12 receives discs 16 from first end 20 and second end 22 at first disc receiving area 32 and second disc receiving area 38, respectively. In one example, first disc receiving area 32 receives four discs 16 from first end 20 and second disc receiving area 38 receives eight discs 16 from second end 22, respectively as shown in FIGS. 1B and 5. Further, first disc receiving area 32 receives tension bolt 14 at the top i.e., from first end 20 and second disc receiving area 38 receives tension bolt 14 at the bottom i.e., from second end 22. As can be seen from FIG. 5, a person skilled in the art understands that discs 16 are sandwiched between tension bolts 14 and inner channel 36. In one example, tension bolts 14 have second O-rings 46 that intersect or contact discs 16.

Subsequently, fiber tube 60 draws through bolt channels 48, disc channels 56 and inner channel 36. Here, fiber tube 60 encompasses third O-rings 62 between tension bolt 14 and each side of discs 16, as shown in FIG. 6. As can be seen from FIG. 5, there are four discs 16 at the top and eight discs 16 at the bottom between inner channel 36 and tension bolt 14. As such, four discs 16 at the top includes five or six third O-rings 62 and eight discs 16 at the bottom includes nine or ten third O-rings 62 between inner channel 36 and tension bolt 14 and provides insulation to fiber tube 60.

In one exemplary embodiment, tension bolt 14 includes two second O-rings 46 of 0.113", four discs 16 with third O-rings 62 of 0.113" on each side and one third O-ring 62 of 0.008" between tension bolt 14 and each side of four discs 16. In one example, six third O-rings 62 of 0.113" and five third O-rings 62 of 0.008" are used for the top. Further, at the bottom, sub 12 includes eight discs 16 with third O-rings 62 of 0.113" on each side and one third O-ring 62 of 0.008" between each side of eight discs 16 and two O-rings 62 tension bolt 14 and. In one example, ten third O-rings 62 of 0.113" and nine third O-rings 62 of 0.008" are used for the bottom.

When assembled (FIG. 5), discs 16 along with third O-rings 62 form a proper seal inside of sub 12 in first disc receiving area 32 and second disc receiving area 38. In one implementation, approximately 31 pounds of torque is applied to the bottom tension bolt 14 (from second end 22). When 31 pounds of torque is administered to the bottom tension bolt 14, proper seal is completed to ensure protection to the insulation, center conductor and fiber tube 60 (i.e., FIMT). When the complete bottom hole assembly is lowered into the well, the hydrostatic pressure compresses discs 16 at the top (first end 20) and third O-rings 62 to the insulation (i.e., inner channel 36) that houses fiber tube 60. When discs 16 are compressed, no pressure can get to the bottom of tension bolt 14, thus protecting the fiber optic strands in fiber tube 60 from the hydrostatic pressure. As no pressure gets through discs 16, it stops the flow of wellbore fluids under hydrostatic pressure from entering the fiber termination sub. This way, presently disclosed fiber optic protection assembly protects the fiber optic cables from the wellbore fluids during deployment of fiber optic intervention cable.

Based on the above, a person skilled in the art understands that the presently disclosed fiber optic protection assembly provides proper sealing into the void or gap created in the sub with the help of discs and/or O-rings. The sub having discs allows to prevent the fluid from being forced into the void of the sub where individual fibers are terminated.

A person skilled in the art appreciates that the fiber optic protection assembly may come in a variety of shapes and sizes depending on the need and comfort of the user. Further, different materials in addition to or instead of materials described herein may also be used and such implementations may be construed to be within the scope of the present invention. Further, many changes in the design and placement of components may take place without deviating from the scope of the presently disclosed fiber optic protection assembly.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A fiber optic protection assembly, comprising:
 a sub comprising disc receiving areas at both ends, wherein said sub comprises an inner channel connecting said disc receiving areas;
 a pair of tension bolts, each tension bolt comprising a bolt channel;
 a plurality of discs, each disc having a disc channel, wherein each of said disc channels has the same diameter as said bolt channel; and
 a fiber tube comprising fiber optic cables,
 wherein a series of said plurality of discs insert in said disc receiving areas from both ends of said sub,
 wherein each tension bolt of said pair of tension bolts inserts through said disc receiving areas from each end of said sub such that said plurality of discs are sandwiched between said inner channel and said tension bolt from each end of sub,
 wherein said fiber tube draws through said bolt channels, said disc channels and said inner channel, and
 wherein said plurality of discs connects to said inner channel and said pair of tension bolts, ensuring proper seal between said inner channel and said pair of tension bolts and prevents fluid from entering into said sub.

2. The fiber optic protection assembly of claim 1, wherein said sub comprises first O-rings at the outside parallel to said inner channel.

3. The fiber optic protection assembly of claim 1, wherein each of said pair of tension bolts comprises second O-rings at the side facing said inner channel.

4. The fiber optic protection assembly of claim 3, wherein said second O-rings at each tension bolt intersect said discs.

5. The fiber optic protection assembly of claim 1, wherein said fiber tube comprises a plurality of third O-rings, wherein each of plurality of third O-rings position in between said tension bolts and adjacent discs, and adjacent discs of said plurality of discs, wherein said plurality of third O-rings helps to seal the gap created between said tension bolts and said adjacent discs, and between adjacent discs of said plurality of discs.

6. The fiber optic protection assembly of claim 5, wherein torque is applied to a tension bolt of said pair of tension bolts to properly seal said fiber tube, said tension bolts, said discs with said sub.

7. The fiber optic protection assembly of claim 5, wherein said plurality of discs and said plurality of third O-rings get compressed with said inner channel when the fiber optic protection assembly is lowered into a well due to hydrostatic pressure applied on a tension bolt of said pair of tension bolts, and ensure that the hydrostatic pressure is not transferred to another tension bolt positioned at other end of said sub and protect said fiber optic cables in said fiber tube.

8. The fiber optic protection assembly of claim 1, wherein said disc receiving areas are machined to ensure a proper seal for said plurality of discs with said sub.

9. The fiber optic protection assembly of claim 1, wherein said fiber tube is a Fiber in Metal Tube (FIMT).

10. The fiber optic protection assembly of claim 1, wherein said bolt channel comprises a tapered section at both ends, wherein said tapered section receives said fiber tube without damage.

11. The fiber optic protection assembly of claim 1, wherein each of said disc channels comprises a tapered section at both ends, wherein said tapered section receives said fiber tube without damage.

12. The fiber optic protection assembly of claim 1, wherein each of said disc channels and said bolt channels comprises a tapered section at both ends, wherein said tapered sections intersect when said plurality of discs positions adjacent to each other and positions adjacent to said tension bolts, and wherein said tapered sections help to receive said fiber tube without damage.

13. The fiber optic protection assembly of claim 12, wherein each of tapered sections has a 45-degree angle.

14. The fiber optic protection assembly of claim 1, wherein said disc receiving areas comprise threaded portions for receiving said pair of tension bolts.

15. A method of providing a fiber optic protection assembly, the method comprising steps of:
    providing a sub comprising disc receiving areas at both ends, said sub comprising an inner channel connecting said disc receiving areas;
    providing a pair of tension bolts, each tension bolt comprising a bolt channel;
    providing a plurality of discs, each disc having a disc channel, each of said disc channels having the same diameter as said bolt channel;
    providing a fiber tube comprising fiber optic cables,
    inserting a series of said plurality of discs in said disc receiving areas from both ends of said sub;
    inserting each tension bolt of said pair of tension bolts through said disc receiving areas from each end of said sub sandwiching said plurality of discs between said inner channel and said tension bolt from each end of sub;
    drawing said fiber tube through said bolt channels, said disc channels and said inner channel; and
    connecting said plurality of discs to said inner channel and said pair of tension bolts, ensuring proper seal between said inner channel and said pair of tension bolts for preventing fluid from entering into said sub.

16. The method of claim 15, further comprising:
    providing a plurality of O-rings at said fiber tube, each of plurality of O-rings positioning between said tension bolts and adjoining discs, and adjacent discs of said plurality of discs; and
    sealing the gap created between said tension bolts and said adjacent discs, and between adjacent discs of said plurality of discs using said plurality of O-rings.

17. The method of claim 16, further comprising applying torque to a tension bolt of said pair of tension bolts for properly sealing said fiber tube, said tension bolts, said discs with said sub.

18. The method of claim 16, further comprising compressing said plurality of discs and said plurality of third O-rings with said inner channel when the fiber optic protection assembly is lowered into a well upon applying hydrostatic pressure on a tension bolt of said pair of tension bolts for ensuring the hydrostatic pressure is not transferred to another tension bolt positioned at other end of said sub and protecting said fiber optic cables in said fiber tube.

19. The method of claim 15, further comprising providing a tapered section at both ends of each of said disc channels and said bolt channels.

20. The method of claim 15, further comprising:
    providing a tapered section at both ends of each of said disc channels and said bolt channels; and
    intersecting said tapered sections when said plurality of discs positions adjacent to each other and positions adjacent to said tension bolts such that said tapered sections to protect said fiber tube from damage.

* * * * *